(12) United States Patent
Choi et al.

(10) Patent No.: US 8,322,019 B2
(45) Date of Patent: Dec. 4, 2012

(54) MULTIPLE TRANSPOSITION METHOD FOR SUPERCONDUCTING WIRE

(75) Inventors: Kyeong Dal Choi, Seoul (KR); Ji Kwang Lee, Wanju-gun (KR); Woo Seok Kim, Seoul (KR); Chan Park, Seoul (KR); Yung Il Kim, Seoul (KR)

(73) Assignees: Korea Polytechnic University Industry Academic Cooperation Foundation, Siheung-si (KR); Woosuk University Industry Academic Cooperation Foundation, Wanju-gun (KR)

( * ) Notice: Subject to any disclaimer, the term of this patent is extended or adjusted under 35 U.S.C. 154(b) by 0 days.

(21) Appl. No.: 12/997,652

(22) PCT Filed: Jul. 5, 2010

(86) PCT No.: PCT/KR2010/004355
§ 371 (c)(1),
(2), (4) Date: Dec. 13, 2010

(87) PCT Pub. No.: WO2011/062344
PCT Pub. Date: May 26, 2011

(65) Prior Publication Data
US 2011/0239443 A1 Oct. 6, 2011

(30) Foreign Application Priority Data
Nov. 11, 2009 (KR) .................. 10-2009-0112302

(51) Int. Cl.
*H01B 13/02* (2006.01)
*H01B 7/30* (2006.01)
*H01B 12/06* (2006.01)
*H01B 12/08* (2006.01)

(52) U.S. Cl. ................ 29/599; 29/868; 174/125.1

(58) Field of Classification Search .......... 29/599, 29/868; 174/125.1
See application file for complete search history.

(56) References Cited

U.S. PATENT DOCUMENTS
2007/0056158 A1* 3/2007 Lee et al. .................. 29/599
* cited by examiner

*Primary Examiner* — Livius R Cazan
(74) *Attorney, Agent, or Firm* — NSIP Law

(57) ABSTRACT

Provided is a multiple transposition method for superconducting wire, by making each superconducting wire unit from second-generation superconducting wires that were firstly transposed and then transposing each superconducting wire unit in such a manner that the phase of each unit can be changed along the length, comprising preparing wires by making curves on superconducting wires in such a manner that the superconducting wires of a thin multiple layer grown epitaxially are slit in zigzags and then making the curves repeatedly and by machining the wires with a desired length; making first-transposed superconducting wire units by combining a plurality of the prepared wires such that curves of adjacent wires come in touch to each other and are superposed; preparing a superconducting wire unit bundle by arranging the first-transposed superconducting wires units and by locating a plurality of the first-transposed superconducting wire units in parallel along the length; and making a second transposition on the first-transposed superconducting wire units by rotating the plurality of superconducting wire units on the central axis of the superconducting wire unit bundle along the length to be twisted and combined with each other.

3 Claims, 4 Drawing Sheets

MULTIPLE TRANSPOSITION METHOD FOR SUPERCONDUCTING WIRE

CROSS-REFERENCE TO RELATED APPLICATIONS

This application is a National Stage entry into the United States of International Application No. PCT/KR2010/004355, filed on Jul. 5, 2010, which claims the benefit of Korean Patent Application No. 10-2009-0112302, filed on Nov. 11, 2009, in the Korean Intellectual Property Office, the entire disclosure of which is incorporated herein by reference for all purposes.

BACKGROUND

1. Field

The following description relates to a multiple transposition method for superconducting wire, in particular to a multiple transposition method for making each superconducting wire unit from second generation superconducting wires that were firstly transposed and then transposing each superconducting wire unit in such a manner that the phase of each unit can be changed along the length.

2. Description of Related Art

Superconductivity is a phenomenon that electrical resistance becomes zero when temperature, magnetic field or current is maintained below a certain critical value.

In certain materials, electrical resistance vanishes below certain temperature, and these materials allow electricity flow without generating heat, thereby no energy loss occurs. These materials are referred to superconductor, and superconductivity occurs in certain materials and is influenced by temperature, magnetic field and transport current.

Superconductor allows current to flow without resistance only below superconducting transition temperature (Tc) and critical magnetic field (Hc), and For example, critical current density (Jc) exists that is a maximum transport current density whose current is capable of flowing with no resistance. Regarding to the application of the superconductors, it is preferable to manufacture superconductors in the shape of wire or tape, and the manufactured superconductors are being applied to the superconducting electromagnet that generates a high magnetic field.

The coil is produced by winding wires in various geometric shapes, and a magnetic field is generated when current flows through wires. There is no power loss due to resistance if the wire is a superconductor, and this wire is called a superconducting coil.

The superconducting coil or wire is applied to a transformer, a motor, a MRI (Magnetic Resonance Imaging), and a spectroscopy of NMR (Nuclear Magnetic Resonance), and current below critical current, which is a maximum current that keeps superconductivity, must be maintained such that superconductor can be applied to wires of power appliances including superconducting transformer. In case that, in particular, a plurality of superconductor are manufactured in parallel for the large current flow, the sharing of current should be uniform among parallel conductors. If not uniform, a certain conductor from the parallel superconducting conductors exceeds a critical current itself due to the current distribution and thus superconducting wire can be damaged due to the loss of superconducting characteristics.

When coil is manufactured by overlapping several strands of superconducting wires, the balancing of each wire impedance causes the increase of critical current of the whole wires as well as the decrease of AC loss. Therefore, the transposition is very important to prevent the current distribution as to the superconducting wires.

Regarding prior arts of transposition technologies using superconducting wires, there is known "Roebel Bar" from German company, SIMENS. Others are such that the transposition is implemented at the current input terminal after the coils are prepared, and since the second generation superconducting wire substituting for the first generation superconducting wire uses a method for deposition of a superconducting layer on a nickel-alloy substrate, it is hard to carry out a transposition like the "Roebel Bar" method. Moreover, the problems arise that the method for implementing transposition at the current input terminal can hardly implement the transposition if there are many coils, and the benefit of superconducting wires cannot be obtained due to the loss generated by heat at the current input terminal.

Transposition method for superconducting wires shown in FIG. 1 provides a transposition method comprising: preparing a plurality of wires by making curves successively and repeatedly by means of slitting in zigzags on superconducting wires of a thin multiple layer grown epitaxially and then machining the wires with a desired length; and combining the plurality of the prepared wires by superposing curves of wires to come in touch each other.

Also, regarding a process for such superconducting wires, a shearing process, a wire electrical-discharge machining, a press machining, etc. are known.

However, in case that the intensity of electricity required is as high as thousands of to tens of thousands of ampere and thus tens of to hundreds of wires are necessary to consist of transposition wires, the manufacturing of wires by the shear machining or the wire electrical-discharge machining requires that tens of to hundreds of curves should be formed for the transposition and thus wires having tens of to hundreds of meter should be processed. Therefore, during successive process of wires, the productivity decreases sharply and the connection of wires after the machining become worse since the space between curves increases.

Further, in case of the press machining, since the distance in between curves according to the number of wires forming curves for the transposition should be adjusted and thus a mold for a press head should be made in addition, manufacturing cost increases and process for twisting tens of to hundreds of wires together is very complicated, resulting that a productivity decreases and a quality of transposition is deteriorated.

SUMMARY

In one general aspect, there is provided a transposition method for superconducting wires, the method including: preparing wires by making curves on superconducting wires such that the superconducting wires of a thin multiple layer grown epitaxially are slit in zigzags, forming the curves repeatedly and by machining the wires with a desired length, forming first-transposed superconducting wire units by combining a plurality of the prepared wires such that curves of adjacent wires come in touch to each other and are superposed, preparing a superconducting wire unit bundle by: arranging the first-transposed superconducting wires units, and locating a plurality of the first-transposed superconducting wire units in parallel along the length, and forming a second transposition on the first-transposed superconducting wire units by rotating the plurality of superconducting wire units on the central axis of the superconducting wire unit bundle along the length to be twisted and combined with each other.

In the transposition method for superconducting wires, the superconducting wire units may be rotated such that the position of the upper and lower parts of the unit itself is not changed.

The transposition method for superconducting wires may further include forming a third transposition on the second-transposed superconducting wire unit bundles by: locating a plurality of superconducting wire unit bundles in parallel, and rotating the bundles along the length such that the bundles are twisted and combined with each other.

Other features and aspects may be apparent from the following detailed description, the drawings, and the claims.

Figure 1:
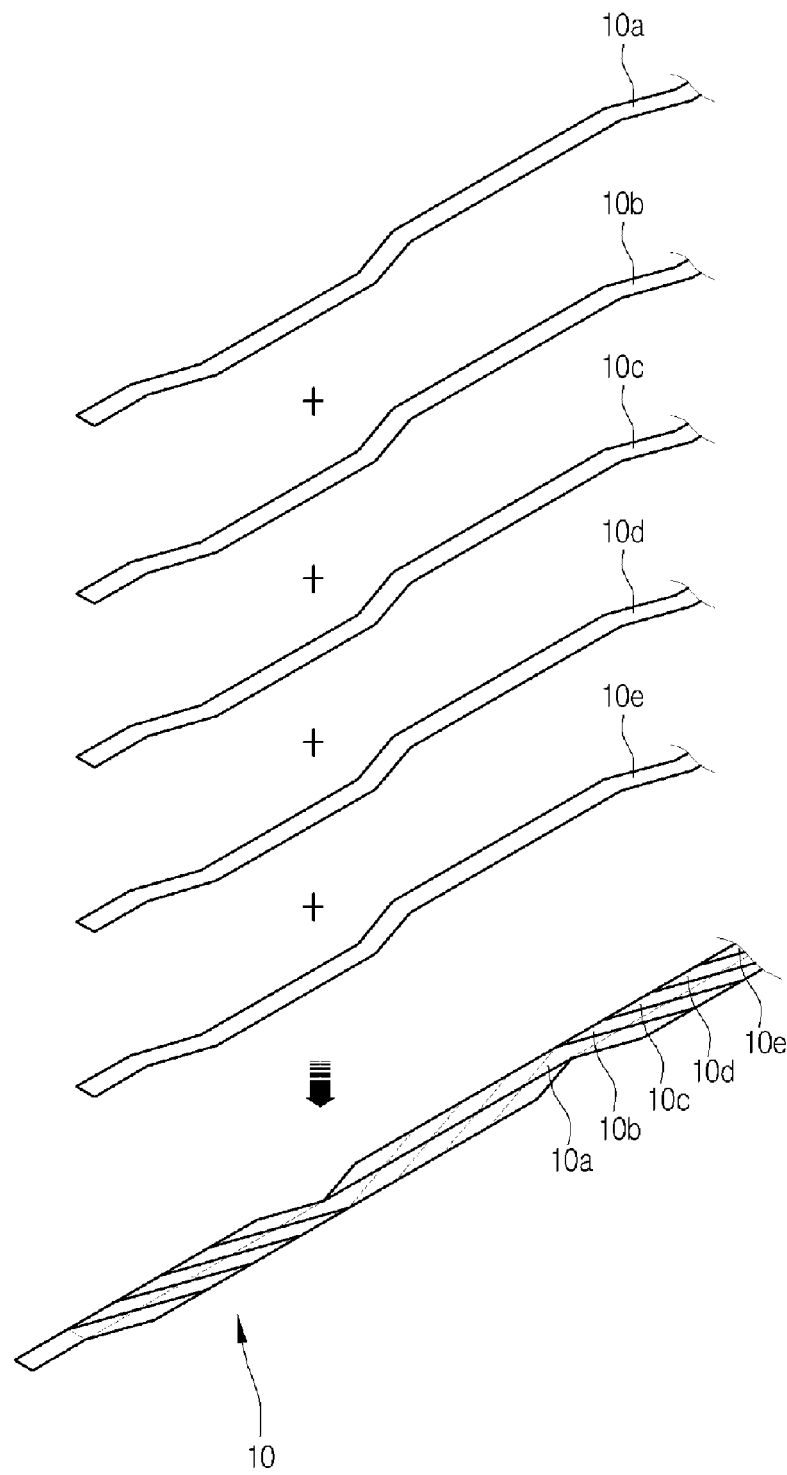
FIG. 1 shows the preparation of a superconducting wire unit in multiple transposition method for superconducting wire according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

According to embodiments, the multiple transposition method for the transposed second-generation superconducting wires, includes: preparing wires by making curves on superconducting wires such that the superconducting wires of a thin multiple layer grown epitaxially are slit in zigzags and then making the curves repeatedly and by machining the wires with a desired length, making first-transposed superconducting wire units by combining a plurality of the prepared wires such that curves of adjacent wires come in touch to each other and are superposed, preparing a superconducting wire unit bundle by arranging the first-transposed superconducting wires units and by locating a plurality of the first-transposed superconducting wire units in parallel along the length, and making a second transposition on the first-transposed superconducting wire units by rotating the plurality of superconducting wire units on the central axis of the superconducting wire unit bundle along the length to be twisted and combined with each other.

According to the multiple transposition method for superconducting wires as described above, first-transposed superconducting wire units may be used that consist of relatively few number (e.g., three to five) of wires, and a second transposition on a plurality of superconducting wire units may allow the transposition of many wires while the number of patterns of wires to be produced is reduced, and the transposition on the superconducting appliances of large current and the manufacturing and managing of superconducting wires may be done more easily and the manufacturing process may be very simple, and the production cost may be reduced, as well.

Also, in accordance with an embodiment, since it may be possible to re-transpose the second-transposed superconducting wires, i.e., it may be possible to make a multiple transposition which may be more than 3 times, the number of superconducting wires to be transposed according to the intensity of electricity required may be adjusted easily.

In one embodiment, the superconducting wire will be explained with regard to the second generation superconducting wire produced by the deposition of a superconducting layer on, e.g., a nickel alloy substrate.

First, in a transposition method for superconducting wires according to an embodiment, wires may be prepared by making curves on the superconducting wires such that the superconducting wires of a thin multiple layer grown epitaxially may be slit in zigzags and then repeating the development of the curves, and by machining the wires with a desired length.

For example, wires 10a, 10b, 10c, 10d, 10e may be prepared by slitting superconducting wires to be processed in zigzags to have a width suitable for the process, and then a cyclic process for making curves having, e.g., less than 125 mm in length, may be repeated successively, followed by machining the superconducting wires with a required length according to the slit shape.

It may be desired for the decrease of AC loss generated at superconducting wire to make curves on the superconducting wire by slitting, and the AC loss may be a very important factor, since the loss on the superconducting wire may cause an increase of cooling load.

Then, the plurality of the prepared wires 10a, 10b, 10c, 10d, 10e may be superposed and then combined such that the curves of adjacent wires come in touch each other, e.g., converge.

In one example embodiment, the number of wires is five, however the number is not limited to five, rather it may be appropriately more than three, as desired.

The plurality of wires may be combined such that the second wire 10b may be attached to the lower part of the first wire 10a and the curve of the second wire 10b may be superposed to be in contact with the curve of the first wire 10a, followed by two adjacent wires being combined by twisting. In this manner, a first-transposed superconducting wire unit 10 may be prepared by combining five wires to each other.

Then, a plurality of the first-transposed superconducting wire units may be prepared, and a superconducting wire unit bundle 20 may be prepared by placing the plurality of the first-transposed superconducting wire units 10, 11, 12, 13 in parallel along the length.

In one example embodiment, the number of superconducting wire unit may be four, however the number may be adjusted to other appropriate number, such as three or five, according to the intensity of electricity required.

The embodiment may be configured such that the plurality of superconducting wire unit 10, 11, 12, 13 may have a 2×2 arrangement in which two of the units are located in the upper position and the other two of the units are located in the lower position. The bundle of the plurality of superconducting wire unit arranged as described above is referred to as a "superconducting wire unit bundle 20."

Also, in an example embodiment, each superconducting wire unit 10, 11, 12, 13 may have a shape of a thin tape having a width of 12 mm and a thickness of 100 μm.

Then, a second transposition may be applied to the superconducting wires by twisting the superconducting wire units to each other For example, the second transposition may be carried out by rotating the plurality of the superconducting wire units 10, 11, 12, 13 along the length such that the superconducting wire units may be displaced by the rotation on the central axis of the superconducting wire unit bundle 20.

FIGS. 2 to 5 show an example of the rotation of each superconducting wire unit by 90 degrees, and the rotation angle may be 180 or 360 degree according to the wire length desired.

In one embodiment, the length by which superconducting wire unit, having width of 12 mm and thickness of 100 μm, may rotate by 90 degrees is 50 cm, and with this constitution, the second transposition may be made to each thin tape-shaped superconducting wire unit without the unit being twisted or wrenched.

Figure 2:
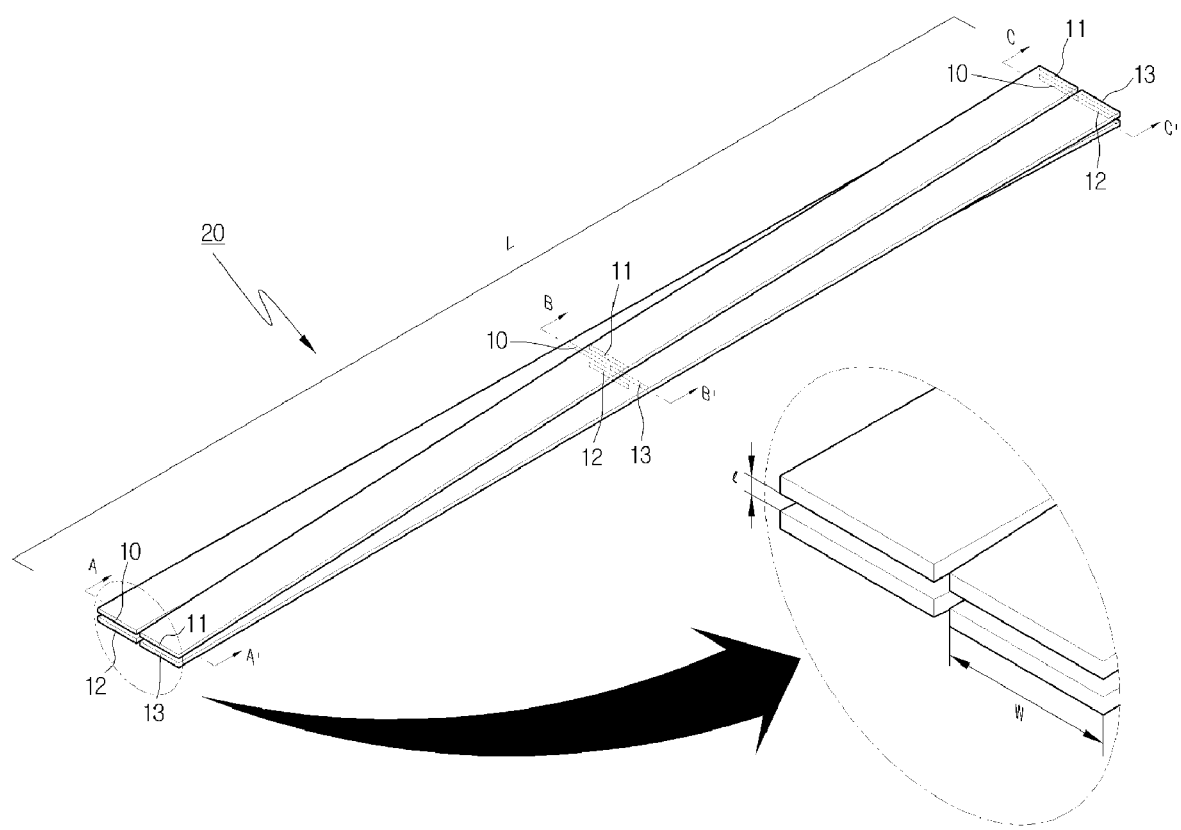
FIG. 2 shows a second transposition according to an embodiment.
Figure 3:
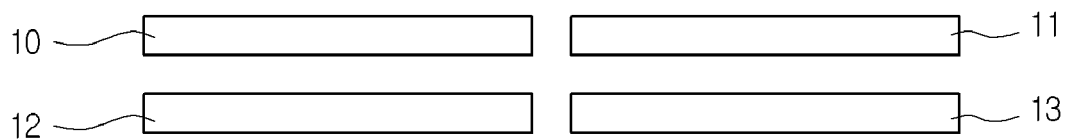
FIGS. 3 to 5 represent respective cross sections of FIG. 2 taken from A-A', B-B', and C-C'.
Figure 4:
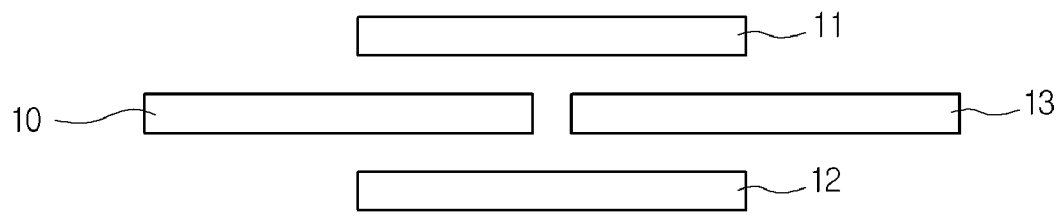
Figure 5:
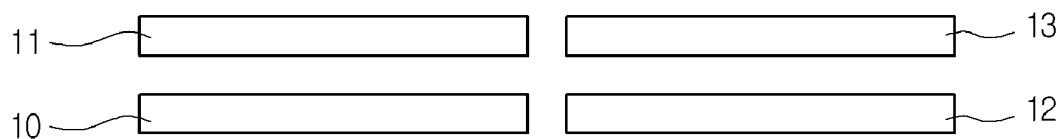
Figure 6:
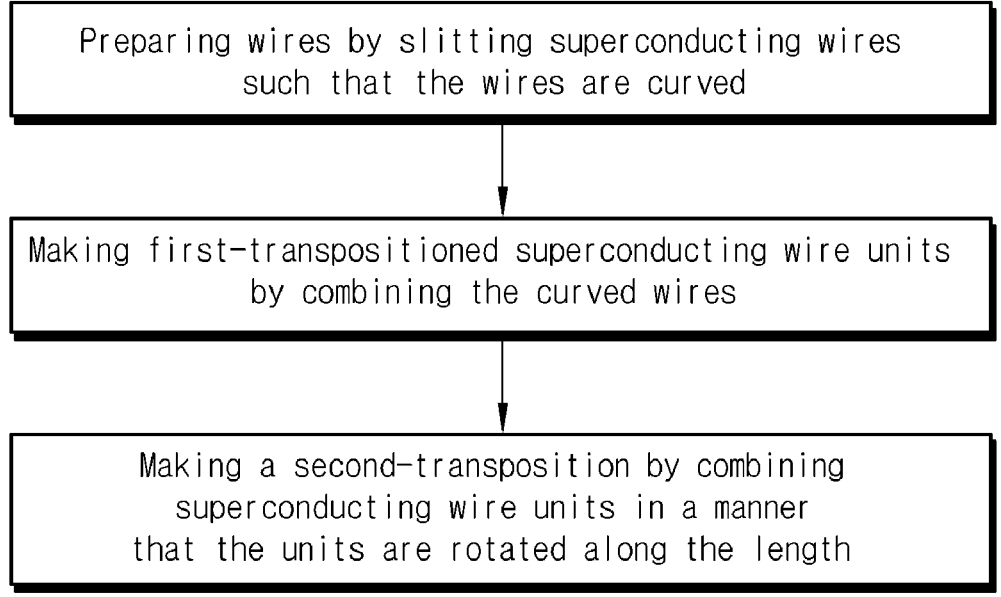
FIG. 6 is a flow chart showing multiple transposition method for superconducting wire according to an embodiment.

Taken from the view of A-A' cross section of FIG. 2, the first superconducting wire unit 10 may be located at an upper left region, the second superconducting wire unit 11 may be located at an upper right region, the third superconducting wire unit 12 may be located at a lower left region, and the fourth superconducting wire unit 13 may be located at a lower right region.

Each superconducting unit 10, 11, 12, 13 arranged as described above may be rotated counterclockwise on the central axis of the superconducting wire unit bundle 20.

For example, taken from the view of B-B' cross section that is at the intermediate part of 90 degree phase change, the second superconducting wire unit 11 may be located on an upper region, the first superconducting wire unit 10 may be located on a center left region, the fourth superconducting wire unit 13 may be located on a center right region, and the third superconducting unit 12 may be located on a lower region.

Also, taken from the view of C-C' cross section that is rotated by 90 degree, the second superconducting wire unit 11 may be located on an upper left region, the fourth superconducting wire unit 13 may be located on an upper right region, the first superconducting wire unit 10 may be located on a lower left region, and the third superconducting unit 12 may be located on a lower right region.

As described above, the plurality of superconducting wire units 10, 11, 12, 13 may be combined by rotating the plurality of the superconducting wire units 10, 11, 12, 13 along the length such that the units rotate on the center axis of the superconducting unit bundle 20, and therefore the second transposition may be made to the plurality of superconducting wire units.

For example, the superconducting wire unit may be rotated such that the position of the upper and lower parts of the unit itself is not changed. That is, the superconducting wire unit itself may not be twisted or reversed and the superconducting wire unit may be rotated on the central axis of the superconducting wire unit bundle while the upper part keeps facing upward and the lower part keeps facing downward.

As described above, since the superconducting wire unit may be of the thin tape shape having a width of 12 mm and a thickness of 100 μm, twisting of it may cause cracks or fractures on the superconducting wire.

Also, since the superconducting wire units may be spaced apart by the gap 1 that is about 1 mm and its width may be about 12 mm, the superconducting wire unit may be rotated on the central axis of the superconducting wire unit bundle without being twisted or wrenched, even if the superconducting wire unit is rotated such that the position of the upper and lower parts of the unit itself is not changed where the length L of the unit by which the unit is rotated by 90 degree is 50 cm.

Since many wires, e.g., 20 wires, may be transposed with only five patterns of wires, the transposition of the superconducting wire may be easily applied to the superconducting appliances of large current, and the superconducting wire may be manufactured and managed easily, and thus the manufacturing process may be very simple, and the cost to produce it may be reduced.

Meanwhile, the superconducting wire to which the second transposition is applied may be transposed again such that the superconducting wire to which third transposition is applied may be formed.

That is, the third transposition may be applied to the superconducting wire unit bundle 20 in the same manner as the application of the second transposition to the superconducting wire unit. A plurality of the second-transposed superconducting wire unit bundles 20 may be arranged in parallel, and the plurality of superconducting wire unit bundles may be rotated along the length of the bundle such that the phase is changed, and then the plurality of superconducting wire unit bundles may be twisted and combined with each other, and the third transposition may be carried out.

Since it may be possible to transposition the second-transposed superconducting wire once more (multiple, e.g., more than 3 times, transposition), a large number of wires may be transposed with a small number of wire patterns, and the control of the number of superconducting wires to be transposed according to the intensity of electricity required may be easy, and the manufacturing process and cost may be reduced.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A transposition method for superconducting wires, the method comprising:
   preparing superconducting wires by making curves on superconducting wires of a thin multiple layer grown epitaxially such that the superconducting wires of a thin multiple layer grown epitaxially are slit in zigzags;
   forming the curves repeatedly and by machining the superconducting wires with a desired length;
   forming first-transposed superconducting wire units by combining a plurality of the prepared superconducting wires such that curves of adjacent superconducting wires come in touch to each other and are superposed;
   preparing second-transposed superconducting wire unit bundles, each being formed by:
      locating a plurality of the first-transposed superconducting wire units in parallel along the length; and forming a second transposition on the first-transposed superconducting wire units by rotating the plurality of superconducting wire units on the central axis of the superconducting wire unit bundle along the length to be twisted and combined with each other.

2. The transposition method for superconducting wires of claim 1, wherein the first-transposed superconducting wire units are rotated such that the positions of the upper and lower parts of the first-transposed superconducting wire units themselves are not changed.

3. The transposition method for superconducting wires of claim 1, further comprising forming a third transposition on the second-transposed superconducting wire unit bundles by:
  locating a plurality of superconducting wire unit bundles in parallel; and
  rotating the bundles along the length such that the bundles are twisted and combined with each other.

* * * * *